United States Patent
McDaniel et al.

(10) Patent No.: US 6,316,553 B1
(45) Date of Patent: Nov. 13, 2001

(54) PROCESS FOR PRODUCING POLYMERS USING A COMPOSITION COMPRISING AN ORGANOMETAL COMPOUND, A TREATED SOLID OXIDE COMPOUND, AND AN ORGANOALUMINUM COMPOUND

(75) Inventors: Max P. McDaniel; Kathy S. Collins; Marvin M. Johnson; James L. Smith; Elizabeth A. Benham, all of Bartlesville; Gil R. Hawley, Dewey; Christopher E. Wittner; Michael D. Jensen, both of Bartlesville, all of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/561,166

(22) Filed: Apr. 28, 2000

Related U.S. Application Data

(62) Division of application No. 09/080,629, filed on May 18, 1998, now Pat. No. 6,107,230.

(51) Int. Cl.$^7$ ............................................. C08F 2/14
(52) U.S. Cl. .................. 526/64; 526/95; 526/99; 526/159; 526/348.2; 526/348.4; 526/348.5
(58) Field of Search .................. 526/65, 95, 99, 526/159, 348.2, 348.4, 348.5

(56) References Cited

U.S. PATENT DOCUMENTS 5,861,352 * 1/1999 Gila et al. ............................ 502/155

* cited by examiner

Primary Examiner—David W. Wu
Assistant Examiner—William K. Cheung
(74) Attorney, Agent, or Firm—Polly C. Owen

(57) ABSTRACT

A process of using a catalyst composition to polymerize at least one monomer to produce a polymer. The process comprising contacting the catalyst composition, at least one monomer in a polymerization zone under polymerization conditions to produce the polymer. The catalyst composition is produced by a process comprising contacting at least one organometal compound, at least one treated solid oxide compound, and at least one organoaluminum compound.

28 Claims, No Drawings

US 6,316,553 B1

PROCESS FOR PRODUCING POLYMERS USING A COMPOSITION COMPRISING AN ORGANOMETAL COMPOUND, A TREATED SOLID OXIDE COMPOUND, AND AN ORGANOALUMINUM COMPOUND

This application is a Divisional of application Ser. No. 09/080,629, filed May 18, 1998, now U.S. Pat. No. 6,107,230.

FIELD OF THE INVENTION

This invention is related to the field of compositions that can be used to polymerize monomers into at least one polymer.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960, however, their low productivity did not allow them to be commercialized. About 1975, it was discovered that contacting one part water with two parts trimethylaluminum to form methyl aluminoxane, and then contacting such ethyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been use in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts, however, these catalysts have not been entirely satisfactory.

Therefore, the inventors provide this invention to solve these problems.

SUMMARY OF THE INVENTION

An object of this invention is to provide a process that produces a composition that can be used to polymerize monomers into at least one polymer.

Another object of this invention is to provide said composition.

Another object of this invention is to provide a process to polymerize monomers into at least one polymer using said composition.

Another object of this invention is to provide a manufacture that comprises at least one said polymer.

Another object of this invention is to provide a machine that comprises at least one said manufacture.

In accordance with one embodiment of this invention, a process to produce a composition of matter is provided. Said process comprises (or optionally, consists essentially of, or consists of) contacting an organometal compound, a treated solid oxide compound, and an organoaluminum compound to produce said composition, wherein said composition consists essentially of (or optionally, consists of) a post-contacted organometal compound, a post-contacted treated solid oxide compound, and optionally, a post-contacted organoaluminum compound.

In accordance with another embodiment of this invention, a composition of matter is provided. Said composition consists essentially of a post-contacted organometal compound, a post-contacted treated solid oxide compound, and optionally, a post-contacted organoaluminum compound.

In accordance with another embodiment of this invention, a process to polymerize monomers into at least one polymer using said composition is provided. Said process comprises contacting said composition with monomers.

In accordance with another embodiment of this invention a manufacture is provided. Said manufacture comprises at least one said polymer.

In accordance with another embodiment of this invention a machine is provided. Said machine comprises at least two said manufactures.

These objects, and other objects, will become more apparent to those with ordinary skill in the art after reading this disclosure.

It should be noted that the phrase "consisting essentially of" means that the only other items (such as, for example, process steps, and other compounds) included within the scope of the claims are those items that do not materially affect the basic and novel characteristics of the claimed invention.

It should also be noted that the phrase "consisting of" means that the no other items (such as, for example, process steps, and other compounds) are included within the scope of the claims, except items that are impurities ordinarily associated with a composition, or items that are process steps ordinarily associated with a process.

DETAILED DESCRIPTION OF THE INVENTION

Organometal compounds used in this invention have the following general formula.

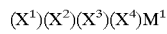

$(X^1)(X^2)(X^3)(X^4)M^1$                         FORMULA ONE

In this formula, $M^1$ is selected from the group consisting of titanium, zirconium, and hafnium. Currently, it is most preferred when $M^1$ is zirconium.

In this formula ($X^1$) is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

The substituents on the substituted cyclopentadienyls, substituted indenyls, and substituted fluorenyls, can be aliphatic groups, cyclic groups, combinations of aliphatic and cyclic groups, and organometallic groups, as long as these groups do not substantially, and adversely, affect the polymerization activity of the composition. Additionally, hydrogen can be a substituent.

Suitable examples of aliphatic groups are hydrocarbyls, such as, for example, paraffins and olefins. Suitable examples of cyclic groups are cycloparaffins, cycloolefins, cycloacetylenes, and arenes. Additionally, alkylsilyl groups where each alkyl contains 1–12 carbon atoms, alkyl halide groups where each alkyl contains 1–12 carbon atoms, or halides, can also be used.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, and iodo.

In this formula $(X^3)$ and $(X^4)$ are independently selected from the group consisting of (hereafter "Group OMC-II") halides, aliphatic groups, cyclic groups, combinations of aliphatic and cyclic groups, and organometallic groups, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

When $(X^2)$ is selected from Group OMC-I, it should be noted that $(X^1)$ and $(X^2)$ can be joined with a bridging group, such as, for example, aliphatic bridging groups, cyclic bridging groups, combinations of aliphatic and cyclic bridging groups, and organometallic bridging groups, as long as the bridging group does not substantially, and adversely, affect the polymerization activity of the composition.

Suitable examples of aliphatic bridging groups are hydrocarbyls, such as, for example, paraffins and olefins. Suitable examples of cyclic bridging groups are cycloparaffins, cycloolefins, cycloacetylenes, and arenes. Additionally, it should be noted that silicon and germanium are also good bridging units.

Various processes are known to make these compositions. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such compositions are as follows:

bis(cyclopentadienyl) hafnium dichloride;
bis(cyclopentadienyl) zirconium dichloride;
[ethyl(indenyl)$_2$]hafnium dichloride;
[ethyl(indenyl)$_2$]zirconium dichloride;
[ethyl(tetrahydroindenyl)$_2$]hafnium dichloride
[ethyl(tetrahydroindenyl)$_2$]zirconium dichloride;
bis(n-butylcyclopentadienyl)hafnium dichloride;
bis(n-butylcyclopentadienyl)zirconium dichloride;
((dimethyl)(diindenyl)silane)zirconium dichloride;
((dimethyl)(diindenyl)silane)hafnium dichloride:
((dimethyl)(ditetrahydroindenyl)silane)zirconium dichloride;
((dimethyl)(di(2-methyl indenyl))silane)zirconium dichloride; and
bis(fluorenyl)zirconium dichloride.

Organoaluminum compounds have the following general formula.

$$Al(X^5)_n(X^6)_{3-n} \qquad \text{FORMULA TWO}$$

In this formula $(X^5)$ is a hydrocarbyl having from 1–20 carbon atoms. Currently, it is preferred when $(X^5)$ is an alkyl having from 1 to 10 carbon atoms. However, it is most preferred when $(X^5)$ is selected from the group consisting of methyl, ethyl, propyl, butyl, and isobutyl.

In this formula $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula "n" is a number from 1 to 3 inclusive. However, it is preferred when "n" is 3.

Examples of such compounds are as follows:

trimethylaluminum;
triethylaluminum;
tripropylaluminum;
diethylaluminum ethoxide;
tributylaluminum;
triisobutylaluminum hydride;
triisobutylaluminum; and
diethylaluminum chloride.

Currently, triethylaluminum is preferred.

The treated solid oxide compounds are compounds that have had their Lewis acidity increased. It is preferred when said treated solid oxide compound comprises oxygen and at least one element selected from the group consisting of groups 2, 3, 4, 5, 6, 7, 8, 9, 10, 11, 12, 13, 14, and 15 of the periodic table, including lanthanides and actinides (See Hawley's Condense Chemical Dictionary, 11th Edition). However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr. It is important that these treated solid oxide compounds have electron withdrawing ability, while not wanting to be bound by theory, it is believed that a treated solid oxide compound should have a higher Lewis acidity compared to the untreated solid oxide compound. However, it is hard to accurately measure the Lewis acidity of these treated, and untreated solid oxide compounds so other methods have been used. Currently, comparing the activities of treated, and untreated solid oxide compounds under acid catalyzed reactions is preferred.

Treated solid oxide compounds can be produced in a variety of ways, such as, for example, by gelling, co-gelling, or impregnation of one compound onto another, followed by calcination.

In general, it is preferred to contact at least one solid oxide compound, such as, for example, alumina, zirconia, titania, and mixtures thereof, or with mixtures of other solid oxides such as, for example, silica alumina, with at least one metal salt compound and at least one electron-withdrawing anion source compound, to form a first mixture, followed by calcining this first mixture to form a treated solid oxide compound. In the alternative, a solid oxide compound, a metal salt compound, and an electron-withdrawing anion source compound can be contacted and calcined simultaneously. In another alternative, the metal salt compound and the electron-withdrawing anion source compound can be the same compound.

The metal salt compound is any compound that increases the Lewis acidity of the solid oxide under the conditions given herein for producing the treated solid oxide compound. It is preferred when said metal in said metal salt is selected from the group consisting of groups 2, 3, 4, 5, 6, 7, 8, 9, 10, 11, 12, 13, 14, and 15 of the periodic table, including lanthanides and actinides (See Hawley's Condense Chemical Dictionary, 11th Edition). However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr.

The electron-withdrawing anion source compound is any compound that increases the Lewis acidity of the solid oxide under the conditions given herein for producing the treated solid oxide compound.

The electron-withdrawing anion source compounds increase the Lewis acidity of the solid oxide by contributing to the formation of an electron withdrawing anion, such as, for example, sulfates, halides, and triflate. It should be noted that one or more different electron withdrawing anions can be used. Furthermore, it is believed that metal salt compounds enhance the polymerization activity of the composition.

The acidity of the solid oxide compound can be further enhanced by using two, or more, metal salts and/or electron-withdrawing anion source compounds in two, or more, separate contacting steps. An example of such a process is contacting at least one solid oxide compound with a first electron-withdrawing anion source compound to form a first mixture, followed by calcining this first mixture, followed by contacting with a second electron-withdrawing anion source compound to form a second mixture, followed by calcining said second mixture to form a treated solid oxide compound. It should be noted that the first and second electron-withdrawing anion source compounds can be the same, but are preferably different.

Suitable examples of solid oxide compounds include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$: and mixtures thereof, such as, for example, silica-alumina and silica-zirconia. It should be noted that solid oxide compounds that comprise Al—O bonds are currently preferred.

It is important that the solid oxide compound is also calcined. This calcining can be conducted in an ambient atmosphere, preferably a dry ambient atmosphere, at a temperature in the range of about 200° C. to about 900° C., and for a time in the range of about 1 minute to about 100 hours. Currently, temperatures from about 400° C. to about 800° C. and a time in the range of about 1 hour to about 10 hours, are preferred.

Treated solid oxide compounds, should have pore volumes greater than about 0.01 cc/g, preferably greater than about 0.1 cc/g, and most preferably, greater than about 1 cc/g.

Treated solid oxide compounds should have surface areas greater that about 1 m²/g, preferably greater than 100 m²/g, and most preferably greater than 200 m²/g.

The compositions of this invention can be produced by contacting an organometal compound, an treated solid oxide compound, and an organoaluminum compound, together. This contacting can occur in a variety of ways, such as, for example, blending. Furthermore, each of these compounds can be fed into the reactor separately, or various combinations of these compounds can be contacted together before being further contacted in the reactor, or all three compounds can be contacted together before being introduced into the reactor. Currently, one method is to first contact the organometal compound and the treated solid oxide compound together, for about 1 minute to about 24 hours, preferably, about 1 minute to about 1 hour, at a temperature from about 10° C. to about 200° C., preferably about 25° C. to about 100° C., to form a first mixture, and then contact this first mixture with an organoaluminum compound to form the composition. During contacting, or after contacting, the mixtures or the composition can be calcined. This calcining can be conducted in an ambient atmosphere, preferably a dry ambient atmosphere, at a temperature in the range of about 300° C. to about 900° C., and for a time in the range of about 1 minute to about 100 hours. Currently, temperatures from about 500° C. to about 700° C. and a time in the range of about 1 hour to about 10 hours, are preferred. Currently, it is preferred to use dry nitrogen as the ambient atmosphere.

After contacting, the composition consists essentially of, (or consists of) a post-contacted organometal compound, a post-contacted treated solid oxide compound, and optionally, a post-contacted organoaluminum compound. It should be noted that the post-contacted treated solid oxide compound is the majority, by weight, of the composition. Since the exact order of contacting is not known, it is believed that this terminology best describes the composition's components.

The composition of this invention has an activity greater than a composition that uses the same organometal compound, and the same organoaluminum compound, but uses untreated Ketjen grade B alumina (see comparative examples 4, 5, and 6) instead of the treated solid oxide compounds of this invention. This activity is measured under slurry polymerization conditions, using isobutane as the diluent, and with a polymerization temperature of 50–150° C., and an ethylene pressure of 400–800 psig. The reactor should have substantially no indication of any wall scale, coating or other forms of fouling.

However, it is preferred if the activity is greater than 100 grams polyethylene per gram of treated solid oxide compound per hour (hereafter "gP/(gS·hr)"), more preferably greater than 250, even more preferably greater than 500, even more preferably greater than 1000, and most preferably greater than 2000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

These compositions are often sensitive to hydrogen and sometimes incorporate comonomers well, and usually produce polymers with a low HLMI/MI ratio.

One of the important aspects of this invention is that no aluminoxane needs to be used in order to form the composition. This also means that no water is needed to help form such aluminoxanes. This is beneficial because water can sometimes kill a polymerization process. Additionally, it should be noted that no borate compounds need to be used in order to form the composition. In summary, this means that the composition, which is heterogenous, and which can be used for polymerizing monomers, can be easily and inexpensively produced because of the substantial absence of any aluminoxane compounds or borate compounds. Additionally, no organochromium needs to be added, nor any $MgCl_2$ needs to be added to form the invention.

The monomers useful in this invention, are unsaturated hydrocarbons having from 2 to 20 carbon atoms. Currently, it is preferred when the monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. However, when a homopolymer is desired, it is most preferred to use ethylene, or propylene, as the monomer. Additionally, when a copolymer is desired, it is most preferred to use ethylene and hexene as the monomers.

Processes that can polymerize monomers into polymers are known in the art, such as, for example, slurry polymerization, gas phase polymerization, and solution polymerization. It is preferred to perform a slurry polymerization in a loop reactor. Furthermore, it is even more preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

It should be noted that under slurry polymerization conditions these compositions polymerize ethylene alone, or ethylene with a 1-olefin, or propylene very well. In particular, the compositions used in this process produce good quality polymer particles without substantially fouling the reactor. When the composition is to be used in a loop reactor under slurry polymerization conditions, it is preferred when the particle size of the solid mixed oxide compound is in the range of about 10 to about 1000 microns, preferably 25 to 500 microns, and most preferably, about 50 to about 200 microns, for best control during polymerization.

After the polymers are produced, they can be formed into various manufactures, such as, for example, household containers and utensils, drums, fuel tanks, pipes, geomembranes, and liners. Various processes can form these manufactures. Usually, additives and modifiers are added to the polymer in order to provide desired effects. It is believed that by using the invention described herein, manufactures can be produced at a lower cost, while maintaining most, if not all, of the unique properties of polymers produced with metallocene catalysts.

Additionally, these manufactures can be part of a machine, such as, for example, a car, so that the weight of the car will be less, with the attended benefits thereof.

EXAMPLES

These examples provide additional information to a person skilled in the art. These examples are not meant to be construed as limiting the scope of the claims.

Description of the Polymerizations Runs

All polymerization runs were conducted in a steel reactor that had a volume of 2.2 liters. This reactor was equipped with a marine stirrer. During the polymerizations this stirrer was set to run at 400 rpm. This reactor was also surrounded by a steel jacket that was connected to a steel condenser. The steel jacket contained methanol that was boiling. The boiling point of the methanol was controlled by varying the nitrogen pressure that was applied to the steel condenser and the steel jacket. This control method permitted precise temperature control (±0.5° C.).

First, a treated, or untreated, solid oxide compound was charged, under nitrogen, to the reactor, which was dry. Second, organometal compound solution was added to the reactor by syringe. Third, 0.6 liters of isobutane was charged to the reactor. Fourth, organoaluminum compound was added midway during the isobutane addition. Fifth, 0.6 liters of isobutane was charged to the reactor. Sixth, ethylene was added to the reactor to equal 550 psig pressure. Seventh, the reactor was heated to 90° C. This pressure was maintained during the polymerization. During polymerization, stirring continued for the specified time. Activity was determined by recording the flow of ethylene into the reactor to maintain pressure. Eighth, after the specified time, the ethylene flow was stopped and the reactor slowly depressurized. Ninth, the reactor was opened to recover a granular polymer powder.

In all inventive runs, the reactor was clean with no indication of any wall scale, coating or other forms of fouling. The polymer powder was removed and weighed. Activity was specified as grams of polymer produced per gram of treated, or untreated, solid oxide compound charged per hour.

In some cases the treated solid oxide compound and the organometal compound were first pre-contacted, in the reactor, for about half an hour at 90° C. in one liter of isobutane before the organoaluminum compound and ethylene were added to the reactor.

Preparation of Solid Oxides

Silica, grade 952, having a pore volume of 1.6 cc/g and a surface area of about 300 square meters per gram was obtained from W. R. Grace. About 10 grams of this material was placed in a 1.75 inch quartz tube, which was fitted at the bottom with a sintered quartz. While the silica was supported on the disk, dry air was blown up through the disk at the linear rate of about 1.6 to 1.8 standard cubic feet per hour. An electric furnace around the quartz tube was then turned on and the temperature was raised at the rate of 400° C. per hour to a temperature of 600° C. At that temperature, the silica was allowed to fluidize for three hours in the dry air. Afterward, the silica was collected and stored under dry nitrogen.

Some alumina samples were also prepared by the procedure described in the silica preparation. A commercial alumina sold by AKZO Company as Ketjen grade B alumina was obtained, having a pore volume of about 1.78 cc/g and a surface area of around 340 square meters per gram. The temperatures used in the preparation of these aluminas were 400° C., 600° C., and 800° C.

A silica-alumina was also obtained from W. R. Grace (MS 13–110 containing 13% alumina and 87% silica). This silica-alumina had a pore volume of 1.2 cc/g and a surface area of about 300 square meters per gram. This silica-alumina was prepared as described in the silica preparation. The temperature used in the preparation of this silica-alumina was 600° C.

A silica-titania was obtained by co-gellation as described in U.S. Pat. No. 3,887,494 ("Deitz"). Titanyl sulfate was dissolved in concentrated sulfuric acid, to form a first mixture. Afterwards, a sodium silicate solution was slowly added, with vigorous stirring, to this first mixture, to form a second mixture. When the pH of the second mixture reached about 6, this second mixture gelled into a homogenous, substantially-clear first product. This first product was then aged, at 80° C. and a pH 7, for three hours, followed by washing it nine times with water, and two times in 1% ammonium nitrate, to form a second product. This second product, which was a gel, was then azeotropically dried in ethyl acetate, to form a third product. This third product contained 8% titanium. It also had a surface area of 450 square meters per gram and a pore volume of 2.0 cc/g. This silica-titania was then prepared as described in the silica preparation. The temperature use in the preparation of this silica-titania was 600° C.

An alumino-phosphate was prepared according to U.S. Pat. No. 4,364,855 (McDaniel). Aluminum nitrate (380 grams) and mono-ammonium phosphate (94 grams) was dissolved in deionized water to form a first mixture. About 170 milliliters of ammonium hydroxide was then added to this first mixture to form a second mixture. At a pH of about 8 this second mixture gelled to form a first product. This first product was then washed twice in water, and once in n-propanol, before drying overnight at 80° C. under a vacuum, to form a second product. This second product contained a phosphorus to aluminum molar ratio of 0.8, a pore volume of 2.1 cc/g, and a surface area of 250 square meters per gram. This alumino-phosphate was then prepared as described in the silica preparation. The temperature use in the preparation of this alumina-phosphate was 600° C.

Comparative Examples 1–2

These examples demonstrate that an organometal compound contacted with an organoaluminum compound, provides little, if any, polymerization activity.

A polymerization run was made as described earlier. First, an organometal compound was added to the reactor (2 ml of bis(n-butylcyclopentadienyl)zirconium dichloride solution containing 0.5 grams per 100 ml of toluene). Second, half of the isobutane was then added to the reactor. Third, 2 ml of 15 weight percent triethyl aluminum for example 1, or 2 ml of 25 weight percent ethyl aluminum dichloride (EADC) for example 2, were added to the reactor. Fourth, the other half of the isobutane was added to the reactor.

Ethylene was then added to the reactor but no polymerization activity was observed. After one hour of contacting, the reactor was depressurized and opened.

In each case, no polymer was found. These results are shown in Table-I.

Comparative Examples 3–9

These examples demonstrate that contacting a solid oxide compound, with an organometal compound, and with an organoaluminum compound, provided little, if any, polymerization activity.

Each of the solid oxide compounds described earlier was added to the reactor, followed by an organometal compound (2 ml of bis(n-butylcyclopentadienyl)zirconium dichloride solution (0.5 grams per 100 ml of toluene), and then the organoaluminum compound (triethylaluminum). These examples are shown in Table-I.

The first two examples show that contacting an organometal compound with an organoaluminum compound provides little, if any, polymerization activity. The silica example produced almost no polymer. Alumina, which is regarded as more acidic than silica, produced more polymer, but still the activity was very low. The alumino-phosphate, silica-alumina, and silica-titania supports exhibited only marginal activity. Activity is expressed in Table-I as gP/(gS·hr).

Comparative Example 10

Ketjen Grade B alumina was calcined in fluidizing dry air as described in previous examples at 600° C. for three hours, and stored under dry nitrogen. Then 9.3 grams of this material was again heated under fluidizing nitrogen to 600° C. At this temperature 2.3 mls of carbon tetrachloride was injected into the nitrogen stream ahead of the alumina. It evaporated over a period of several minutes and was carried up through the alumina bed, where it reacted to chloride treat the surface. This material was then stored under dry nitrogen and later tested for polymerization activity. Results are shown in Table II.

Comparative Example 11

Ketjen Grade B alumina was slurried in isopropanol alcohol, to which sulfuric acid was added in an amount equivalent to 2.5% of the alumina weight. The alcohol was then evaporated off at about 100° C. under vacuum overnight. A sample was then calcined in dry air as described above at 600° C. for three hours. This material was then stored under dry nitrogen and later tested for polymerization activity. Results are shown in Table II.

Example 12

A 24.68 gram sample of virgin Ketjen Grade B alumina was impregnated with a solution of 4.2 grams of cupric chloride dihydrate in 55 mls of deionized water. It was then dried overnight at 100° C. under vacuum, pushed through a 35 mesh screen, and calcined in dry fluidizing air at 600° C. for three hours in order to convert much of the chloride to a mixed oxide. 16.53 grams of this material was then calcined under fluidizing nitrogen at 600° C. into which 4.3 mls of carbon tetrachloride was injected, as described above, in order to re-chlorinate the surface. This material was then stored under dry nitrogen and later tested for polymerization activity. It yielded 164 grams of polyethylene having a melt index of 0.17, a high load melt index of 4.02 and a HLMI/MI ratio of 23.6. Results are shown in Table II.

Example 13

A solution of 5.0 grams of cupric sulfate pentahydrate in 50 mls of deionized water was impregnated onto 20.0 grams of virgin Ketjen Grade B alumina. It was dried overnight under vacuum at 100° C., pushed through a 100 mesh screen, and calcined in fluidizing dry air at 600° C. for three hours. This material was then stored under dry nitrogen and later tested for polymerization activity. Results are shown in Table II.

Example 14

A 13.35 gram sample of the material described above in Example 13 was then calcined again under nitrogen at 600° C. Into the gas stream ahead of the sample was injected 3.4 mls of carbon tetrachloride which vaporized and was carried through the sample bed where it reacted. This material was then stored under dry nitrogen and later tested for polymerization activity. Results are shown in Table II.

Example 15

A 9.0 gram sample of Ketjen Grade B alumina which had been previously calcined in air at 600° C. for three hours was then impregnated with a solution 4.77 grams of anhydrous gallium trichloride dissolved in 24 mls of carbon tetrachloride. The solvent was evaporated on a hot plate under flowing nitrogen. A 12.74 gram sample of this material was then calcined again under air at 600° C. for three hours to convert much of the gallium chloride to a mixed oxide. The gas stream was then changed to nitrogen and ahead of the sample was injected 3.4 mls of carbon tetrachloride which vaporized and was carried through the sample bed where it reacted to re-chlorinate the surface. This material was then stored under dry nitrogen and later tested for polymerization activity. Results are shown in Table III.

Examples 16 & 17

A solution of 50 mls of heptane and 25 mls of tin tetrachloride liquid was impregnated onto a 50.0 gram sample of Ketjen Grade B alumina. The sample became warm and evolved HCl gas, indicating some reaction with moisture in the structure. It was then dried overnight under vacuum at 100° C. and pushed through a 35 mesh screen. A portion of this material was then calcined in dry air at 600° C. for three hours to convert some of the tin chloride species to a mixed oxide. Then 4.9 grams of this material was calcined at 600° C. in dry nitrogen into which 1 ml of carbon tetrachloride was injected in order to re-chlorinate the surface. This material was then stored under dry nitrogen and later tested for polymerization activity. In one experiment it yielded 202 grams of polyethylene having a melt index of 0.16, a high load melt index of 3.27, a HLMI/MI ratio of 20.7, a weight average MW of 174,000, a number average MW of 57,500, and Mw/Mn of 3.1. Results are shown in Table III.

Example 18

A solution of 60 mls of deionized water and 6.0 grams of silver nitrate was impregnated onto a 30.0 gram sample of Ketjen Grade B alumina. It was then dried overnight under vacuum at 100° C. and pushed through a 35 mesh screen. A 12.6 gram portion of this material was then calcined in dry air at 600° C. for three hours to convert the silver species to a mixed oxide. Then the gas stream was changed to nitrogen while still at 600 C. and 1.9 mls of carbon tetrachloride was injected in order to chlorinate the surface. This material was then stored under dry nitrogen and later tested for polymerization activity. Results are shown in Table III.

Example 19

A solution of 9.0 grams of niobium pentaethoxide in 40 mls of isopropanol was impregnated onto a 20.0 gram sample of Ketjen Grade B alumina. It was then dried overnight under vacuum at 100° C. and pushed through a 35 mesh screen. A 10.68 gram portion of this material was then calcined in dry air at 600° C. for three hours to convert the niobium species to a mixed oxide. Then the gas stream was changed to nitrogen while still at 600° C. and 1.6 mls of carbon tetrachloride was injected in order to chlorinate the surface. This material was then stored under dry nitrogen and later tested for polymerization activity. Results are shown in Table III.

Example 20

To 20 grams of a solution of 50% manganese dinitrate in water was added another 35 mls of deionized water. This solution was then impregnated onto a 20.0 gram sample of Ketjen Grade B alumina. It was then dried overnight under vacuum at 100° C. and pushed through a 35 mesh screen. A 9.61 gram portion of this material was then calcined in dry air at 600° C. for four hours to convert the manganese species to a mixed oxide. Then the gas stream was changed to nitrogen while still at 600° C. and 2.3 mls of carbon tetrachloride was injected in order to chlorinate the surface. This material was then stored under dry nitrogen and later tested for polymerization activity. Results are shown in Table III.

Example 21

A solution of 100 mls of deionized water and 20.0 grams of ammonium metatungstate was impregnated onto a 50.0 gram sample of Ketjen Grade B alumina. It was then dried overnight under vacuum at 100° C. and pushed through a 35 mesh screen. A 15.43 gram portion of this material was then calcined in dry air at 600° C. for three hours to convert the tungsten species to a mixed oxide. Then the gas stream was changed to nitrogen while still at 600° C. and 2.35 mls of carbon tetrachloride was injected in order to chlorinate the surface. This material was then stored under dry nitrogen and later tested for polymerization activity. Results are shown in Table III.

Example 22

A solution of 100 mls of deionized water and 25.0 grams of lanthanum trinitrate hexahydrate was impregnated onto a 50.0 gram sample of Ketjen Grade B alumina. It was then dried overnight under vacuum at 100° C. and pushed through a 35 mesh screen. A 9.38 gram portion of this material was then calcined in dry air at 600° C. for three hours to convert the lanthanum species to a mixed oxide. Then the gas stream was changed to nitrogen while still at 600° C. and 2.4 mls of carbon tetrachloride was injected in order to chlorinate the surface. This material was then tested for polymerization activity where it produced 94.5 grams of polyethylene having a melt index of 0.14, a high load melt index of 2.43, and a HLMI/MI ratio of 17.6. Results are shown in Table III.

Example 23

A solution of 35 mls of deionized water and 7.29 grams of neodymium trichloride hexahydrate was impregnated onto a 23.53 gram sample of Ketjen Grade B alumina. It was then dried overnight under vacuum at 100° C. and pushed through a 100 mesh screen. A portion of this material was then calcined in dry air at 600° C. for three hours to convert the neodymium species to a mixed oxide. Then 10.2 grams of this material was heated under nitrogen to 600° C. again and while still at 600° C. 2.5 mls of carbon tetrachloride was injected in order to re-chlorinate the surface. This material was then stored under dry nitrogen and later tested for polymerization activity. Results are shown in Table III.

Comparitive Example 24

A 2.9 gram sample of Ketjen Grade B alumina which had previously been calcined in dry air for three hours at 600° C., was moistened with 7.5 mls of dichloromethane. Then 2.9 mls of a 1 molar solution of antimony pentachloride in dichloromethane was added to form a slurry. The solvent was then evaporated off under flowing nitrogen on a hot plate. This material was then stored under dry nitrogen and later tested for polymerization activity. Results are shown in Table III.

Example 25

A 1.55 gram sample of the material from Example 23 was calcined at 600° C. in air for one hour to convert some of the antimony species to a mixed oxide. Then the gas stream was changed to nitrogen while still at 600° C. and 0.4 mls of carbon tetrachloride was injected in order to re-chlorinate the surface. This material was then stored under dry nitrogen and later tested for polymerization activity. Results are shown in Table III.

Comparative Example 26

Ketjen Grade B alumina was calcined at 600° C. in air for three hours. Then 10.42 grams of this material was again calcined under 600° C. nitrogen. 2.6 mls of carbon tetrachloride was injected in order to chlorinate the surface. This material was then stored under dry nitrogen and later tested for polymerization activity. It yielded 280 grams of polyethylene having a density of 0.9410, a melt index of 0.61, a high load melt index of 9.87, and a HLMI/MI ratio of 16.2. Results are shown in Table IV.

Comparitive Example 27

A 4.5 gram sample of Ketjen Grade B alumina which had previously been calcined in dry air for three hours at 600° C., was slurried in a solution of 0.5 grams ammonium bifluoride in 30 mls of methanol. The solvent was then evaporated off under flowing nitrogen on a hot plate. The resultant solid was then calcined in nitrogen at 500° C. for two hours. This material was then stored under dry nitrogen and later tested for polymerization activity. Results are shown in Table IV.

Example 28

A solution of 40 mls of deionized water and 2.0 grams of zinc dichloride was made. A few drops of nitric acid had to be added to dissolve all the zinc. This solution was then impregnated onto a 10 gram sample of Ketjen Grade B alumina. Thus the zinc chloride loading was 20% of the alumina. It was then dried overnight under vacuum at 100° C. and pushed through a 100 mesh screen. A portion of this material was then calcined in dry air at 600° C. for three hours to convert the zinc species to a mixed oxide. This material was then stored under dry nitrogen and later tested for polymerization activity. Results are shown in Table IV.

Example 29

A solution of 35 mls of deionized water and 1.9 grams of zinc chloride was made. A few drops of nitric acid had to be added to dissolve all of the zinc. This solution was then impregnated onto a 18.35 gram sample of Ketjen Grade B alumina. Thus the zinc chloride loading was 10% of the alumina. It was then dried overnight under vacuum at 100° C. and pushed through a 100 mesh screen. A portion of this material was then calcined in dry air at 600° C. for three hours to convert the zinc species to a mixed oxide. Then 11.37 grams of this material was heated under nitrogen to 600° C. again and while still at 600° C. 2.85 mls of carbon tetrachloride was injected in order to chlorinate the surface. This material was found to have a pore volume of 0.90 cc/g and a surface area of 248 square meters per gram. It was then stored under dry nitrogen and later tested for polymerization activity. It yielded 158 grams of polyethylene having a density of 0.9406. Results are shown in Table IV.

Example 30

A solution of 435 mls of deionized water, 34.65 grams of zinc chloride, and 2.5 mls of nitric acid was made and impregnated onto a 170.35 gram sample of Ketjen Grade B alumina. Thus the zinc chloride loading was 20% of the alumina. It was then dried overnight under vacuum at 100° C. and pushed through an 80 mesh screen. A portion of this material was then calcined in dry air at 600° C. for three hours to convert the zinc species to a mixed oxide. Then 25.96 grams of this material was heated under nitrogen to 600° C. again and while still at 600 C. 2.4 mls of carbon tetrachloride was injected in order to chlorinate the surface. This material was then stored under dry nitrogen and later tested for polymerization activity. Results are shown in Table IV.

Example 31

A solution of 100 mls of deionized water, 13.03 grams of zinc chloride, and a few drops of nitric acid was made and impregnated onto 64.84 grams of Ketjen Grade B alumina. Thus the zinc chloride loading was 20% of the alumina. It was then dried overnight under vacuum at 100° C. and pushed through a 100 mesh screen. A portion of this material was then calcined in dry air at 600° C. for three hours to convert the zinc species to a mixed oxide. Then 35.94 grams of this material was heated under nitrogen to 600° C. again and while still at 600° C., 5.5 mls of carbon tetrachloride was injected in order to chlorinate the surface. This material was then stored under dry nitrogen and later tested for polymerization activity. Results are shown in Table IV.

Example 32

A solution of 43 mls of deionized water, 7.3 grams of zinc chloride, and a few drops of nitric acid was made and impregnated onto a 17.24 gram sample of Ketjen Grade B alumina. Thus the zinc chloride loading was 40% of the alumina. It was then dried overnight under vacuum at 80° C. and pushed through an 100 mesh screen. A portion of this material was then calcined in dry air at 600° C. for three hours to convert the zinc species to a mixed oxide. Then 12.47 grams of this material was heated under nitrogen to 600° C. again and while still at 600° C. 3.1 mls of carbon tetrachloride was injected in order to chlorinate the surface. It was found to have a pore volume of 0.89 cc/g and a surface area of 217 square meters per gram. This material was then stored under dry nitrogen and later tested for polymerization activity. It yielded 157.8 grams of polyethylene having a melt index of 0.69, a high load melt index of 11.4, and a HLMI/MI ratio of 16.5. Results are shown in Table IV.

Comparative Example 33

A solution of 50 mls of deionized water, 4.0 grams of zinc chloride, and a few drops of nitric acid was made and impregnated onto a 20.0 gram sample of W. R. Grace Grade 952 silica. Thus the zinc chloride loading was 20% of the alumina. It was then dried overnight under vacuum at 80° C. and pushed through an 100 mesh screen. A portion of this material was then calcined in dry air at 600° C. for three hours to convert the zinc species to a mixed oxide. Then 19.08 grams of this material was heated under nitrogen to 600° C. again and while still at 600° C. 4.8 mls of carbon tetrachloride was injected in order to chlorinate the surface. This material was then stored under dry nitrogen and later tested for polymerization activity. Results are shown in Table IV.

Example 34

A portion of the material created in Example 28 was calcined in dry air at 600° C. for three hours to convert the zinc species to a mixed oxide. Then 4.4 grams of this material was heated under air to 600° C. again and while still at 600° C. 2.9 mls of perfluorohexane was injected in order to fluoridate the surface. This material was then stored under dry nitrogen and later tested for polymerization activity. It yielded 124.5 grams of polyethylene having a melt index of 0.99, a high load melt index of 16.5, a HLMI/MI ratio of 16.5, and a density of 0.9408. Results are shown in Table IV.

Example 35

A 3.0 gram portion of the material created in Example 34 was calcined in dry nitrogen at 600° C. and while still at 600° C. 0.75 ml of carbon tetrachloride was injected in order to chlorinate the surface. This material was then stored under dry nitrogen and later tested for polymerization activity. It yielded 68.5 grams of polyethylene having a melt index of 0.54, a high load melt index of 9.2, a HLMI/MI ratio of 17.0, and a density of 0.9401. Results are shown in Table IV.

TABLE-I

| Ex. # | A[1] | °C.[2] | S[3] | OAC[4] | P[5] | T[6] | A[7] |
|---|---|---|---|---|---|---|---|
| 1[8] | None | NA | 0.0000 | 2 TEA | 0 | 61.1 | 0 |
| 2 | None | NA | 0.0000 | 2 EADC | 0 | 28.0 | 0 |
| 3 | Silica | 600 | 0.5686 | 2 TEA | 0.65 | 63.0 | 1 |
| 4 | Alumina | 800 | 0.6948 | 1 TEA | 2.7 | 30.7 | 8 |
| 5 | Alumina | 600 | 0.2361 | 2 TEA | 6.9 | 60.9 | 29 |
| 6 | Alumina | 400 | 0.8475 | 1 TEA | trace | 57.2 | 0 |
| 7 | Alumino-Phosphate (0.8) | 600 | 0.8242 | 1 TEA | 45 | 66.0 | 50 |
| 8 | Silica-Alumina | 600 | 0.3912 | 1 TEA | 8.3 | 40.0 | 32 |
| 9 | Silica-Titania | 600 | 0.1392 | 2 TEA | 0 | 60.0 | 0 |

Table-I Notes
[1]This is the untreated solid oxide compound used.
[2]This is the calcining temperature.
[3]This is the amount of solid oxide compound, in grams, being contacted with the other compounds.
[4]This is the amount, in milliliters of organoaluminum compound used and the type of organoaluminum used. The TEA was a 15 weight percent solution of triethylaluminum in heptane.
[5]This is the amount of polymer produced in grams.
[6]This is the amount of time used in minutes.
[7]This is the activity in gP/(gS.hr).
[8]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE-II

| Ex. # | Metal | Anion | °C.[1] | S[2] | OAC[3] | P[4] | T[5] | A[6] |
|---|---|---|---|---|---|---|---|---|
| 10[7] | none | Cl | 600 | 0.2058 | 2 | 351.5 | 63.0 | 1627 |
| 11 | none | SO4 | 600 | 0.7749 | 2 | 2.3 | 30.0 | 3 |
| 12 | Cu | Cl | 600 | 0.0653 | 1 | 164.0 | 60.0 | 2966 |
| 13 | Cu | SO4 | 600 | 0.2045 | 1 | 89.1 | 71.6 | 365 |
| 14 | Cu | Cl & SO4 | 600 | 0.0523 | 1 | 283.4 | 60.3 | 4526 |

Table II Notes
[1]This is the calcining temperature.
[2]This is the amount of solid oxide compound, in grams, being contacted with the other compounds.
[3]This is the amount, in milliliters of organoaluminum compound used and the type of organoaluminum used. The TEA was a 15 weight percent solution of triethylaluminum in heptane.
[4]This is the amount of polymer produced in grams.
[5]This is the amount of time used in minutes.
[6]This is the activity in gP/(gS.hr).
[7]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

TABLE-III

| Ex. # | Metal | °C. | S[2] | PC[7] | OAC[3] | P[4] | T[5] | A[6] |
|---|---|---|---|---|---|---|---|---|
| 15 | Ga | 600 | 0.0543 | 1 | 1 | 200.3 | 60.0 | 3115 |
| 16 | Sn | 600 | 0.0360 | 1 | 1 | 202.0 | 71.1 | 4735 |
| 17 | Sn | 600 | 0.1349 | 1 | 1 | 157.3 | 10.2 | 6859 |
| 18 | Ag | 600 | 0.0659 | 1 | 1 | 340.0 | 60.0 | 5159 |
| 19 | Nb | 600 | 0.0657 | 1 | 1 | 139.1 | 62.4 | 2036 |
| 20 | Mn | 600 | 0.0472 | 1 | 1 | 72.8 | 61.4 | 1507 |
| 21 | W | 600 | 0.0320 | 1 | 1 | 106.9 | 61.0 | 3286 |
| 22 | La | 600 | 0.868 | 1 | 1 | 94.5 | 61.7 | 1059 |
| 23 | Nd | 600 | 0.0473 | 2 | 1 | 55.8 | 61.1 | 1158 |
| 24 | Sb | none | 0.3319 | 1 | 1 | 0 | 60.0 | 0 |
| 25 | Sb | 600 | 0.0716 | 1 | 1 | 166.4 | 61.2 | 2272 |

Table III Notes
[1]This is the calcining temperature.
[2]This is the amount of solid oxide compound, in grams, being contacted with the other compounds.
[3]This is the amount, in milliliters of organoaluminum compound used and the type of organoaluminum used. The TEA was a 15 weight percent solution of triethylaluminum in heptane.
[4]This is the amount of polymer produced in grams.
[5]This is the amount of time used in minutes.
[6]This is the activity in gP/(gS.hr).
[7]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane (condition 1) or 450 psig and 25 mild 1-hexene (condition 2).

TABLE-IV

| Ex. # | Metal | Anion | °C.[1] | S[2] | PC[7] | OAC[3] | P[4] | T[5] | A[7] |
|---|---|---|---|---|---|---|---|---|---|
| 26 | none | Cl | 600 | 0.2005 | 2 | 1 | 280.0 | 61.5 | 1362 |
| 27 | none | F | 500 | 0.8284 | 1 | 2 | 296.8 | 23.2 | 927 |
| 28 | Zn 20% | none | 600 | 0.2475 | 1 | 1 | 17.4 | 35.4 | 119 |
| 29 | Zn 10% | Cl | 600 | 0.0567 | 2 | 1 | 158.0 | 60.0 | 2787 |
| 30 | Zn 20% | Cl | 600 | 0.0376 | 2 | 1 | 209.6 | 64.6 | 5178 |

TABLE-IV-continued

| Ex. # | Metal | Anion | ° C.[1] | S[2] | PC[7] | OAC[3] | P[4] | T[5] | A[7] |
|---|---|---|---|---|---|---|---|---|---|
| 31 | Zn 20% | Cl | 600 | 0.0120 | 1 | 1 | 141.6 | 60.0 | 11800 |
| 32 | Zn 40% | Cl | 600 | 0.0313 | 2 | 1 | 157.8 | 62.8 | 4817 |
| 33 | Zn 20% | Cl | 600 | 0.2860 | 2 | 1 | 0.3 | 76.9 | 1 |
| 34 | Zn 20% | F | 600 | 0.0677 | 2 | 1 | 124.5 | 60.0 | 1839 |
| 35 | Zn 20% | F & Cl | 600 | 0.0240 | 2 | 1 | 68.5 | 63.0 | 2718 |

Table IV Notes
[1]This is the calcining temperature.
[2]This is the amount of solid oxide compound, in grams, being contacted with the other compounds.
[3]This is the amount, in milliliters of organoaluminum compound used and the type of organoaluminum used. The TEA was a 15 weight percent solution of triethylaluminum in heptane.
[4]This is the amount of polymer produced in grams.
[5]This is the amount of time used in minutes.
[6]This is the activity in gP/(gS.hr).
[7]The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane (condition 1) or 450 psig and 25 mild 1-hexene (condition 2).

That which is claimed is:

1. A process of using a catalyst composition to polymerize at least one monomer to produce a polymer, said process comprising contacting said catalyst composition and at least one monomer in a polymerization zone under polymerization conditions to produce said polymer;

wherein said catalyst composition is produced by a process comprising contacting at least one organometal compound, at least one treated solid oxide compound, and at least one organoaluminum compound to produce said catalyst composition;

wherein said organometal compound has the following general formula $$(X^1)(X^2)(X^3)(X^4)M^1$$

wherein $M^1$ is selected from the group consisting of titanium, zirconium, and hafnium, and wherein $(X^1)$ is independently selected from the group consisting of (hereafter "Group OMC-I") cyclopentadienyls, indenyls, fluorenyls, substituted cyclopentadienyls, substituted indenyls, and substituted fluorenyls, and wherein substituents on said substituted cyclopentadienyls, substituted indenyls, and substituted fluorenyls, are selected from the group consisting of aliphatic groups, cyclic groups, combinations of aliphatic and cyclic groups, and organometallic groups, and hydrogen; and wherein $(X^3)$ and $(X^4)$ are independently selected from the group consisting of (hereafter "Group OMC-II") halides, aliphatic groups, cyclic groups, combinations of aliphatic and cyclic groups, and organometallic groups, and wherein $(X^2)$ is selected from the group consisting of Group OMC-I or Group OMC-II, and wherein said organoaluminum compound has the following general formula, $$Al(X^5)_n(X^6)_{3-n}$$

wherein $(X^5)$ is hydrocarbyl having from 1–20 carbon atoms, and
wherein $(X^6)$ is a halide, hydride, or alkoxide, and
wherein "n" is a number from 1 to 3 inclusive;

wherein said treated solid oxide compound is produced by a process comprising contacting at least one solid oxide compound with at least one electron-withdrawing anion source compound and at least one metal salt compound; and wherein said solid oxide compound is calcined before, during, or after contacting said electron-withdrawing anion source or said metal salt compound.

2. A process according to claim 1 wherein said polymerization conditions comprise slurry polymerization conditions.

3. A process according to claim 2 wherein said contacting is conducted in a loop reactor zone.

4. A process according to claim 3 wherein said contacting is conducted in the presence of a diluent that comprises, in major part, isobutane.

5. A process according to claim 2 wherein said at least one monomer is ethylene.

6. A process according to claim 2 wherein said at least one monomer comprises ethylene and an aliphatic 1-olefin having 3 to 20 carbon atoms per molecule.

7. A process according to claim 1 wherein said metal in said metal salt compound is selected from the group consisting of groups, 2, 3, 4, 5, 6, 7, 8, 9, 10, 11, 12, 13, 14, and 15 of the periodic table, including lanthanides and actinides.

8. A process according to claim 1 wherein said treated solid oxide compound is produced by a process comprising:
1) contacting said solid oxide compound with said at least one electron-withdrawing anion source compound and said at least one metal salt compound to form a first mixture; and
2) calcining said first mixture to form said treated solid oxide compound.

9. A process according to claim 1 wherein said treated solid oxide compound is produced by a process comprising simultaneously calcining and contacting said solid oxide compound, said at least one metal salt compound, and said at least one electron-withdrawing anion source compound.

10. A process according to claim 8 wherein said electron-withdrawing anion source compound is selected from the group consisting of sulfates, halides, and triflate.

11. A process according to claim 10 wherein said calcining is conducted for about 1 hour to about 10 hours at a temperature in the range of about 400 to about 800° C.

12. A process according to claim 1 wherein said treated solid oxide compound is produced by a process comprising increasing the acidity of said solid oxide compound by two, or more, metal salts and/or electron-withdrawing anion source compounds in two, or more, separate steps.

13. A process according to claim 12 wherein said treated solid oxide compound is produced by a process comprising:
   1) contacting said at least one solid oxide compound with a first electron-withdrawing anion source compound to form a first mixture;
   2) calcining said first mixture to produce a calcined first mixture;
   3) contacting said calcined first mixture with a second electron-withdrawing anion source compound to form a second mixture; and
   4) calcining said second mixture to form said treated solid oxide compound.

14. A process according to claim 1 wherein said catalyst composition is produced by a process comprising:
   1) contacting said organometal compound and said treated solid oxide compound together for about 1 minute to about 1 hour at a temperature of about 25 to about 100° C. to form a first mixture; and
   2) contacting said first mixture with an organoaluminum compound to form said catalyst composition.

15. A process according to claim 1 wherein said catalyst composition can polymerize ethylene into a polymer with an activity greater than 2000 (gP/(gS·hr)), and
   wherein said organometal compound is selected from the group consisting of bis(cyclopentadienyl)hafnium dichloride;
bis(cyclopentadienyl)zirconium dichloride;
[ethyl(indenyl)$_2$]hafnium dichloride;
[ethyl(indenyl)$_2$]zirconium dichloride;
[ethyl(tetrahydroindenyl)$_2$]hafnium dichloride;
[ethyl(tetrahydroindenyl)$_2$]zirconium dichloride;
bis(n-butylcyclopentadienyl)hafnium dichloride;
bis(n-butylcyclopentadienyl)zirconium dichloride;
((dimethyl)(diindenyl)silane)zirconium dichloride;
((dimethyl)(diindenyl)silane)hafnium dichloride;
((dimethyl)(ditetrahydroindenyl)silane)zirconium dichloride;
((dimethyl)(di(2-methyl indenyl))silane)zirconium dichloride;
bis(fluorenyl)zirconium dichloride, and wherein said organoaluminum compound is selected from the group consisting of
      trimethylaluminum;
      triethylaluminum;
      tripropylaluminum;
      diethylaluminum ethoxide;
      tributylaluminum;
      triisobutylaluminum hydride;
      triisobutylaluminum;
      diethylaluminum chloride, and
   wherein said solid oxide compound is selected from the group consisting of $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$; and mixtures thereof, and wherein said treated solid oxide compound has been contacted with fluoride or chloride or both; and
   wherein said solid oxide compound has been contacted with a metal salt compound where the metal is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

16. A process of using a catalyst composition to polymerize at least one monomer to produce a polymer, said process comprising contacting said catalyst composition and said at least one monomer in a polymerization zone under polymerization conditions to produce said polymer;
   wherein said catalyst composition is produced by a process comprising:
   1) contacting alumina with zinc chloride to produce a zinc-containing alumina;
   2) calcining said zinc-containing alumina at 600° C. for 3 hours and simultaneously contacting with carbon tetrachloride to produce a treated solid oxide compound;
   3) combining said treated solid oxide compound with bis(n-buytlcyclopentadieny)zirconium chloride at a temperature in a range of about 25 to about 100° C. to produce a mixture; and
   4) about between 1 minute and 1 hour, combining said mixture and triethylaluminum to produce said catalyst composition.

17. A process of using a catalyst composition to polymerize at least one monomer to produce a polymer, said process comprising contacting said catalyst composition and said at least one monomer in a polymerization zone under polymerization conditions to produce said polymer;
   wherein said catalyst composition is produced by a process comprising:
   1) contacting an oxide selected from alumina, silica-alumina, aluminophosphate, and mixtures thereof with at least one metal salt to give a metal salt infused oxide;
   2) calcining said metal salt infused oxide to produce a calcined metal salt infused oxide;
   3) contacting said calcined metal salt infused oxide with a treating agent selected from sulfating agents, fluoriding agents, and chloriding agents to produce a treated oxide;
   4) combining (1) said treated oxide, (2) an organoaluminum compound selected from triethylaluminum, triisobutylaluminum, and mixtures thereof; and (3) an organometal compound.

18. A process according to claim 17 wherein said organometal compound is bis(n-butylcyclopentadienyl)zirconium dichloride.

19. A process according to claim 18 wherein said treating agent is a chloriding agent.

20. A process according to claim 19 wherein said treating agent is carbon tetrachloride.

21. A process according to claim 20 wherein said metal salt is selected from zinc chloride and zinc nitrate and wherein said oxide is alumina.

22. A process according to claim 21 wherein said contacting with said metal salt is carried out by impregnation and the resulting metal salt impregnated oxide is dried before said calcining.

23. A process of using a catalyst composition to polymerize at least one monomer to produce a polymer, said process comprising contacting said catalyst composition and said at least one monomer in a polymerization zone under polymerization conditions to produce said polymer;

wherein said catalyst composition is produced by a process comprising:
1) impregnating alumina with an aqueous solution of zinc chloride, said solution also containing a small amount of nitric acid to give an impregnated alumina;
2) drying said impregnated alumina to give a dried impregnated alumina;
3) calcining said dried impregnated alumina to give a calcined impregnated alumina;
4) treating said calcined impregnated alumina with carbon tetrachloride at an elevated temperature to give a treated alumina;
5) combining said treated alumina with triethylaluminum and bis(n-butylcyclopentadienyl)zirconium dichloride.

24. A process according to claim 1 wherein said catalyst composition is produced by a process consisting essentially of contacting said organometal compound, said treated solid oxide compound, and said organoaluminum compound.

25. A polymer produced by the process of claim 1.
26. A polymer produced by the process of claim 16.
27. A polymer produced by the process of claim 17.
28. A polymer produced by the process of claim 23.

* * * * *